Oct. 15, 1968   S. HERTELL   3,405,776
HYDRAULIC-DRIVE SYSTEM AND CONTROL DEVICE THEREFOR
Filed March 7, 1966

Siegfried Hertell
INVENTOR.

BY Ross & Meston

Siegfried Hertell
INVENTOR.

United States Patent Office 3,405,776
Patented Oct. 15, 1968

3,405,776
HYDRAULIC-DRIVE SYSTEM AND CONTROL
DEVICE THEREFOR
Siegfried Hertell, Kelsterbach am Main, Germany, assignor to Alfred Teves KG, Frankfurt am Main, Germany, a corporation of Germany
Filed Mar. 7, 1966, Ser. No. 532,462
Claims priority, application Germany, Mar. 5, 1965,
T 28,108
10 Claims. (Cl. 180—6.3)

ABSTRACT OF THE DISCLOSURE

Vehicular drive wherein a pair of wheels on opposite sides of the vehicle are individually driven by two hydrostatic motors supplied with hydraulic liquid by respective fluid pumps over conduits which are bridged by a shunt path to equalize relatively small pressure differentials between the two conduits, larger pressure differentials causing a valve in the shunt path to shift into an off-normal position in which passage of fluid through the shunt path is blocked or at least severely throttled. The steering post of the vehicle controls a linkage which, during sharp turns, prevents excessive throttling by increasing a biasing force which opposes displacement of the valve or by blocking a passage for hydraulic fluid tending to cause such displacement.

---

My present invention relates to a control device for hydraulic-drive systems and, more particularly, to a hydraulic drive for an automotive vehicle.

It has been proposed heretofore to provide hydraulic-drive systems for an automotive vehicle wherein at least two wheels on opposite sides of the vehicle are each provided with a respective hydraulic motor (generally of the hydrostatic type), each of which is associated with one or more fluid-pressure sources (e.g. hydraulic pumps) driven by the vehicle engine or some other prime mover. Such hydraulic drive systems have the advantage that complicated torque-converter transmissions, mechanical differentials and distributing gears are not required and individual control means can be provided for each of the hydraulic networks so that stepped or substantially stepless regulation of the drive is possible. Furthermore, recent developments in hydraulic pumps and hydrostatic motors have rendered transmissions of this nature relatively efficient so that the losses in power characterizing earlier transmissions can be obviated and a considerable saving with respect to cost of the transmission and a significant reduction in the frequency of repair can be gained. It may, however, be noted that one of the difficulties of a hydrostatic-motor drive of the character described has been the requirement for differential rotation of the wheels on opposite sides of the vehicle during movement of the vehicle about a curve whereby one wheel is rotated at a rate different from that of the other. It has long been recognized that proper movement of the vehicle along a curved path requires the outer wheels of the vehicle, whether driven or nondriven, to move at a relatively high peripheral speed whereas the inner wheels (with respect to the turn) move at a considerably slower speed. In conventional torque-converter drives and the like, it is a common practice to provide a drive shaft extending from the transmission and terminating in a differential whose output shafts are connected to the drive wheels of the vehicle, this differential permitting relative rotation of the drive wheels. In order to prevent freewheeling of one of these wheels concurrently with immobilization of the other (e.g. when the freewheeling wheel slips upon mud or ice, or because of other slippery road conditions), the differential mechanism may be of the limited-slip type wherein governor means, frictional retardation or other arrangements are employed to limit the freewheeling operation of the portion of the differential associated with the slipping wheel. Hydrostatic transmissions of the type with which the present invention is concerned, however, are not provided with mechanical differentials of this character and thus the problems solved by nonslip conventional differentials require different treatment in the case of hydrostatic drives. It has, however, been proposed to provide servo-control means operable by the steering mechanism of the vehicle and controlling a distributing valve adapted to dispatch quantities of hydraulic fluid to the hydraulic motors in accordance with the respective wheel speeds. Alternatively, such servo devices have been employed to modify the pumping rate of variable-capacity pumps in order to accomplish the same purpose. These devices have, however, the significant disadvantage that distributing-valve arrangements in the fluid networks involve relatively high pressure losses and must, in order to accommodate the volumes required by both hydraulic motors, be of relatively massive size, whereas a direct connection between the steering linkage and the variable-capacity motors makes it difficult to regulate the fluid-delivery ratio to each of the motors with the required precision so that relatively high tire wear is encountered.

It is, therefore, the principal object of the present invention to provide an improved hydrostatic-drive system for automotive vehicles and the like which permits differential operation of the output elements of the system.

Another object of this invention is to provide a hydrostatic drive for automotive vehicles having at least one pair of driven wheels and provided with at least one stepped or stepless hydrostatic motor coupled with each of these wheels whereby differential operation of the wheels is permitted, but which in a simple and economical manner is capable of preventing freewheeling of one of these wheels and immobilization of the other under slippery road conditions or the like.

Still another object of this invention is to provide a control device for a hydrostatic system of the character described which can prevent immobilization of one of the wheels and freewheeling of the other, but which enables differential operation of these wheels when required (e.g. for steering of the vehicle).

These objects and others, which will become apparent hereinafter, are attained, in accordance with the present invention, in a hydraulic system for the drive of an automotive vehicle having at least one pair of driven elements (i.e. wheels) on opposite sides thereof for differential rotation upon the travel of the vehicle along a curved path, which comprises at least one hydrostatic motors each coupled with a respective one pair of these wheels and pump means directly connected with these motors via independent fluid-conduit means for supplying these motors, and shunt-valve means interconnecting these conduit means and having a differentially operable valve member responsive to a pressure differential developed between these conduit means as a consequence of a differential fluid demand of the motors. The shunt-valve means is, advantageously, normally open to permit equalization of pressure between the conduit means and differential operation of the elements but is blockable upon the development of a severe or substantial pressure differential between these conduit means indicative of a relatively freewheeling operation of one of the wheels but an immobilization of the other to terminate the shunt flow of liquid to the freewheeling hydraulic network. Advantageously, the shunt-valve means comprises a housing with a longitudinal bore and a piston having a pair of axially spaced heads defining between them a chamber interconnecting the two conduit means and constituting a throttle for the shunted liquid between these conduit means, the valve being further provided with one or more springs for centering the piston assembly so that this chamber constitutes a substantially unblocked but nevertheless throttling passage between the conduit means in its normal position, while throttle bores are provided between these ports and respective pressure chambers on opposite sides of the piston to bias the latter against the centering springs upon the development of a pressure differential in the conduit means as indicated above. Advantageously, the piston is provided with a central throttle passage connecting these chambers while a pair of centering springs are provided, one in each of the chambers.

According to another feature of this invention, means is provided for stressing the centering-spring means in response to operation of the steering gear of the motor vehicle whereby fluid-pressure displacement of the valve member or piston is nullified or restricted when this pressure differential develops as a consequence of a turning movement of the vehicle, thereby preventing blockage of differential operation of the wheels during such turns. It has also been found to be advantageous to provide in the throttle bore connecting each of the ports with the respective chamber at least one device for adjusting the flow of fluid therethrough. In fact, the means for adjusting the flow of fluid through these throttle bores can be stems coupled with the steering gear whereby the fluid-pressure displacement of the piston during curvilinear movement of the vehicle is blocked by obstruction of one or both of these throttle bores.

According to another feature of this invention, the motor vehicle is provided with front- and rear-wheel hydrostatic drives each including a pair of hydrostatic motors coupled with the respective wheels and a pair of hydraulic pumps respectively coupled with these motors. In this system, I have found it to be highly desirable to pair the diagonally opposite wheels and provide them with shunt valves of the character described so that the hydraulic networks of the front and rear wheels are coupled together in diagonal relationship.

The above and other objects, features and advantages of the present invention will be more readily apparent from the following description, reference being made to the accompanying drawing in which.

Figure 1:
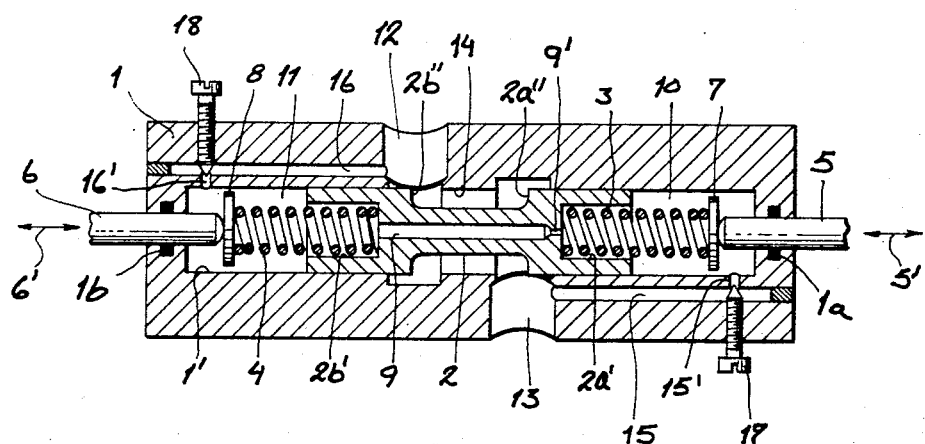
FIG. 1 is an axial cross-sectional view, somewhat diagrammatically illustrating a shunt valve in accordance with the present invention.

Referring first to the valve structure of FIG. 1, it will be seen that a shunt-type valve, in accordance with this invention, comprises a housing 1 having an axially extending cylindrical bore 1' in which a double-headed piston 2 is longitudinally (i.e. axially) shiftable. The piston 2 is centered by a pair of oppositely effective compression springs 3, 4, respectively received in axial recesses 2a' and 2b' in the opposite ends of the piston 2 and constituting the spring means of this invention. Each spring 3, 4 is thus seated against the piston 2 and against a respective spring plate 7, 8 which, in turn, is axially shiftable by a respective axially displaceable stem 5, 6. The steps 5 and 6 extend axially into the cylinder bore 1' at opposite ends of the housing and are sealed by O-rings 1a and 1b, respectively, or by some other conventional sealing arrangement, against leakage of fluid from the bore 1' around the respective pins. The stems 5 and 6 are displaceable axially in the direction of arrows 5' and 6', respectively, to move the respective plates 7 and 8 toward and away from the piston 2, thereby compressing (prestressing) or relieving the respective springs 3 and 4. The stems 5 and 6 are, moreover, connected via suitable links (described below in connection with FIG. 2) with the vehicle-steering mechanisms and thus serve to regulate the position of the piston 2 and the quantity of fluid delivered to the vehicle-wheel motors upon road turns of the vehicle.

The piston 2 is provided with a longitudinal bore 9 whose mouth 9' is constricted so that the bore forms a throttle for fluid passing between the pressure chambers 10 and 11 defined by the heads of the piston 2 at opposite ends of the bore 1'. The housing 1 is further provided with ports 12 and 13 which open into the central bore 1' at a chamber 14 between the piston heads, these ports 12 and 13 being connectable via suitable hydraulic lines with the fluid-delivery ducts assigned to each of a pair of hydraulic motors at opposite sides of the vehicle. The effective area of the bores $2a''$ and $2b''$ of the piston heads confronting the chamber 14 is less than the areas of these heads exposed to fluid pressure in chambers 10 and 11 so that the valve member 2 is a differential-pressure piston. Thus, in the system of FIG. 2, to be described in greater detail hereinafter, the ports 12 and 13 are connected to the ducts feeding the rear-wheel drive motors, whereas in the system of FIG. 3 the ports 12 and 13 at each shunt valve valve are connected to the ducts supplying a front-wheel hydraulic motor on one side and a rear-wheel hydraulic motor on the opposite side of the vehicle, respectively. The ports 12 and 13 may, of course, be provided with suitable fittings for connection with the hydraulic ducts and conduits mentioned above. Thus, the ports 12 and 13 communicate with one another via the chamber 14 to which the inner surfaces $2a''$ and $2b''$ of the heads of the piston 2 are exposed, these inner surfaces providing a throttle effect at the bores 12 and 13.

Additionally, the housing 1 is provided with a pair of further passages 15 and 16, respectively establishing communication between the chamber 10 and the port 13 and between the chamber 11 and the port 12, the passages 15 and 16 being constituted as throttle bores at least at their apertures 15', 16' opening into the chambers 10 and 11. These apertures 15' and 16' are selectively closable via needle-valve screws 17 and 18 to vary the throughflow cross-section of fluid from the ports 12 and 13 to the respective pressure chambers 11 and 10. The screws 17 and 18 permit adjustment of the pressure differential at which the shunt closes.

Referring now to the system of FIG. 2 wherein the shunt valve 101 is diagrammatically illustrated, it will be understood that this valve has the precise structure described with reference to FIG. 1 and is shown in modified form in FIG. 2 only for the sake of clarity and to avoid confusion between mechanical and hydraulic connections. Thus, the hydraulic ports or connections are illustrated at 112 and 113, respectively, and will be equatable with the ports 12 and 13, previously described, while the stems 105 and 106 for biasing the centering springs of the shunt valve are to be considered the equivalent of the stems 5 and 6. From FIG. 2 it will be seen that the stems 105 and 106 are coupled via a linkage 19 with the steering system of the vehicle and, to illustrate this fact, the steering post of the vehicle is illustrated at 19' and is shown to be coupled at 19'' with the linkage 19. Thus, the dot-dash line 19'' may be considered to be the pitman-arm and drag-link arrangement normally provided for engagement with the tie rod of the steering mechanism. The linkage 19 is diagrammatically shown to include a tie rod 19a pivotally connected at 19b and 19c with force-transmission levers 19d and 19e. The latter are fulcrumed at 19f and 19g, respectively, and pivotally connected at 19h and 19i with the stems 105 and 106.

The hydraulic system or drive of the automotive vehicle comprises a supply pump 23 adapted to draw hydraulic fluid from a reservoir 23' and having a pump capacity well in excess of that required for the hydraulic drive so that a portion of the fluid is continuously returned to the reservoir by a pressure-relief or bypass valve 23''. The arrangement 23, 23', 23" constitutes a source of hydraulic fluid which may be used in part for the drive of the vehicle and for whatever other hydraulically operable devices may be provided. A pair of pumps 20 and 21, driven by the vehicle engine (not shown) and having essentially identical capacities and displacements, are connected in parallel with one another to the hydraulic-fluid source 23, 23', 23" via a line 23a and deliver fluid respectively to hydraulic conduits 24 and 25 which, in turn, are directly connected with hydraulic motors 26 and 27, respectively coupled with the vehicle wheels 28 and 29. The hydraulic motors 26 and 27 can be of the hydrostatic type, the outflow from these motors being returned to the source by a hydraulic line 23b. A fluid line 30, connected with duct 24 between the pump 20 and its motor 26, communicates with the port 112 whereas a further line 30', similarly connected to the duct 25 between motor 21 and pump 27, can communicate with the port 113 via a three-way valve 46, in one position of the latter. In another position of this valve, the line 30' can be connected with line 30 via a bypass 47, as will be described below. Thus, the shunt valve 101 in the centered position of its piston 2 (FIG. 1) connects the lines 30 and 30' under normal operating conditions.

During normal straight-line operation of the vehicle, therefore, the engine operates the pumps 20 and 21 so that the latter displace identical quantities of hydraulic fluid per unit time and, consequently, drive their respective hydraulic motors 26 and 27 at identical rates to apply identical torques thereto. Assuming identical road conditions for the wheels 28 and 29 during this type of operation, the torque requirements of the wheels are also identical and the hydraulic-fluid demand and throughput of the motors 26 and 27 are equal. The shunt valve 101 connecting the parallel hydraulic networks 20, 26 and 21, 27 via the lines 30 and 30', respectively, is ineffective under these circumstances. The piston 2 of the shunt valve then occupies its centered position, as illustrated in FIG. 1, and the hydraulic demands of the motors 26 and 27 as well as the hydraulic outputs of the pumps 20 and 21 are identical. The shunt valve 101 is completely open and any minor pressure differences between the fluid conduits 24 and 25 can be equalized.

When, however, the speed of wheel 29 exceeds that of wheel 28 (e.g. because of the engagement of these wheels with different road surfaces, as a consequence of slippage of the wheel 29, or the like), the hydraulic-fluid demand of the motor 27 exceeds that of motor 26 and results in a pressure drop in the line 25 by comparison with that in line 24. A pressure differential is thereby established across the shunt path formed by lines 30, 30' inasmuch as the pump 21 is incapable of supplying the increased demand of the hydraulic motor 27. Hydraulic fluid is bypassed from the line 24 to the line 25 via shunt valve 1 (101) with a slight throttling action in the chamber 14 of this valve. As a consequence of this throttling action, the pressure at port 12 exceeds that of port 13 and an elevated pressure develops at chamber 11 by comparison with chamber 10 and the piston 2 is shifted against the force of spring 3 until the pressure and spring forces in the chambers 10 and 11 are again equal, in sum.

When the pressure differential is very high, the piston 2 closes the shunt connection between the ports 12, 13 or 112, 113, and no further fluid is permitted to pass between the duct 24 and the conduit 25. In this manner, freewheeling of the drive wheel 29 and immobilization of the wheel 28 is prevented since hydraulic fluid is delivered to the motor 26 upon closure of the shunt valve. Thus, the equalizing but blockable shunt valve 1, 101 functions as a limited-slip differential in permitting relative movement of the wheels 28 and 29 to accommodate a turning movement of the vehicle but prevents immobilization of one wheel in the event of a freewheeling tendency of the other. When there is a tendency of wheel 28 to run freely, the piston 2 is shifted to the left into a shunt-blocking position to ensure continued delivery of fluid to motor 27 and the application of torque thereby to the wheel 29.

Moderate curves encountered by the vehicle are accommodated by the valve 101 as a consequence of the normal equalizing operation of the valve to eliminate minor pressure differentials between the lines 24 and 25. During exceptionally sharp curves, however, the pressure differential between the conduits 24 and 25 tends to increase sharply since the outer wheel tends to rotate at a relatively high speed while the inner wheel of the set coupled by the shunt is relatively slowed.

To permit such differential rotation of the wheels without blockage of the shunt valve, the stems 5(105), 6(106) are connected to the steering linkage and bias the springs 3 and 4 counter to the direction in which the pressure differential tends to shift the piston 2, thereby sharply increasing the pressure difference required to displace this piston in accordance with the degree of curvature of the turn. Thus, normal road operations are not hindered by the valve but freewheeling and immobilization is precluded even when the vehicle passes through steep turns. Advantageously, the abutment plates 7 and 8 for the springs 3, 4 are so disposed that a complete blockage of the shunt is prevented by engagement of the piston 2 with one of these plates in severe off-normal positions of the steering gear corresponding to sharp turns, thereby ensuring that a torque will continuously be applied to each of the wheels.

Figure 3:
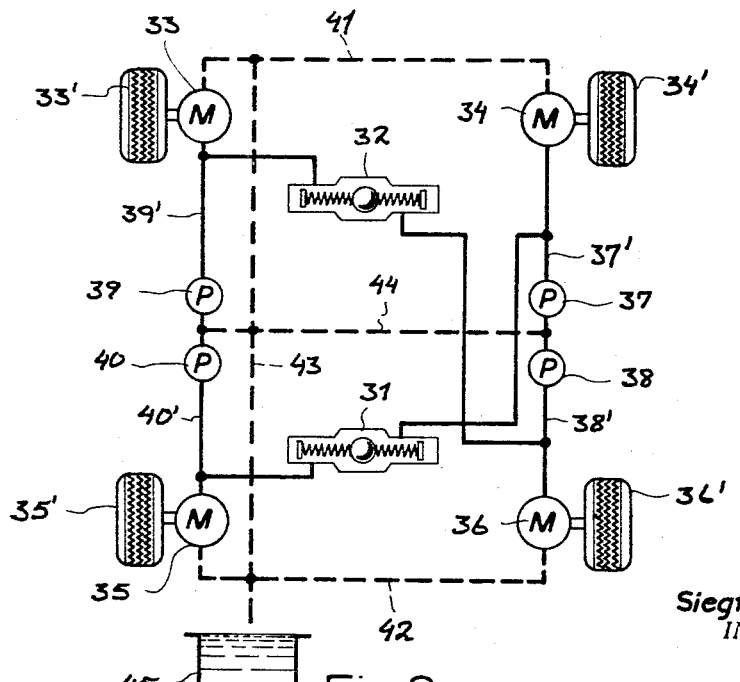
FIG. 3 is a hydraulic flow diagram of the drive system of another type of automotive-vehicle transmission.

FIG. 3 illustrates a hydraulic drive for an automotive vehicle in which each of the four wheels of the vehicle is driven directly so that the hydraulic sytsem constitutes a so-called "four-wheel drive." In this system, the front wheels 33' and 34' are coupled with respective hydrostatic motors 33 and 34, each of which is provided with a respective pump 39, 37 driven by the vehicle engine. Hydraulic lines 39' and 37' connect the respective pumps 39 and 37 with the hydrostatic motors 33 and 34 without the intervention of any distributing valve so that delivery of hydraulic fluid to the respective motors is unimpeded. Each of the systems 39, 39', 33 and 37, 37', 34 constitutes a respective hydrostatic-drive network on the corresponding side of the vehicle. Similarly, the rear wheels 35' and 36' are coupled with respective hydrostatic motors 35 and 36 supplied with hydraulic fluid via engine-driven pumps 40 and 38. In this case too, hydraulic lines 40' and 38' connect the respective pumps 40 and 38 with the hydrostatic motors 35 and 36. As indicated in broken lines, the hydraulic-fluid efflux from the motors 33, 34 and 35, 36 is collected in return lines 41 and 42, respectively, and delivered to the hydraulic supply line 44. When an excess of hydraulic fluid is available in the return line over that required for the pumps 37–40, this excess passes via line 43 to the reservoir 45 which concurrently serves as a source of hydraulic fluid in the event the demand of the pumps 37–40 exceeds the requirements of the hydrostatic motors 33–36. Another pair of independent hydrostatic driven networks 40, 40', 35 and 38, 38', 36 is thereby provided for the rear wheels. According to an important aspect of this invention as mentioned above, each pair of diagonally opposite wheels of a four-wheel drive have their hydraulic-drive networks shunted by a blockable shunt valve of the type illustrated in FIG. 1 and FIG. 4. The shunt valve 32 is, consequently, provided between the line 39' of the left-front wheel and the line 38' of the right-rear wheel, whereas the shunt valve 31 is connected between line 37' of the right-front wheel and line 40' of the left-rear wheel. Thus, differential action is permitted between the opposite sides of the vehicle with respect to its longitudinal axis and freewheeling is precluded both between opposite sides of the vehicle and between the front and back sets of wheels.

Figure 2:
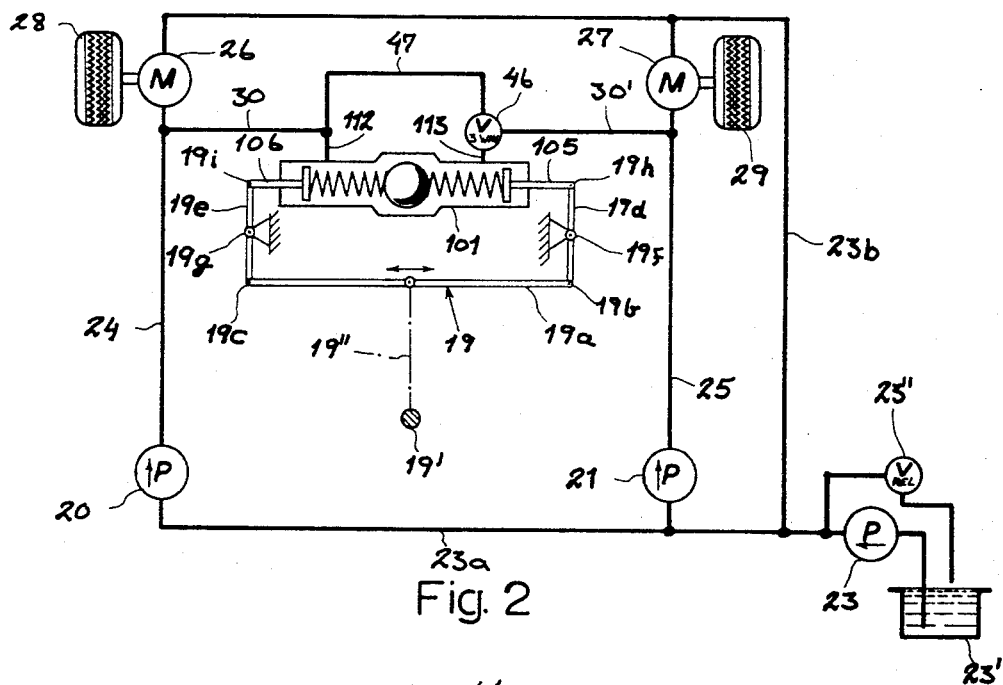
FIG. 2 is a diagram of the hydraulic networks of a vehicle drive using the shunt valve of FIG. 1 but wherein the latter is illustrated only schematically.

The three-way valve 46 of FIG. 2 has been found to be especially convenient in that it permits the selective connection of the shunt valve 101 between the hydrostatic networks 20, 24, 26 and 21, 25, 27 but also because it opens, in another position of this valve, a bypass connection 47 for the automatic and blockable valve 101 to be brought into play when, for example, freewheeling of one wheel and immobilization of the other is desirable or is not disadvantageous. In the third position of the valve, the line 30' can be disconnected both from the port 113 and from the line 47 so that differential rotation of the wheels is prevented. It has been observed that the use of the three-way valve 46 as described is extremely convenient and important in many circumstances encountered with automotive vehicles.

Figure 4:
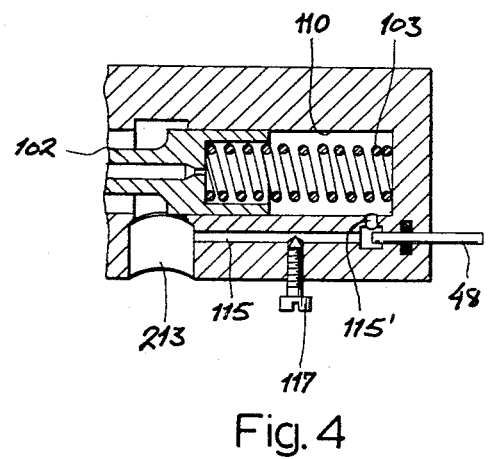
FIG. 4 is a fragmentary axial cross-sectional view illustrating a modification of the valve of FIG. 1.

In the modification of FIG. 4, the shifting of the piston 2 upon operation of the steering gear of the automotive vehicle is limited or blocked not by stems 105 or 106, adapted to increase the spring pressure counter to the differential displacement of the piston 2, but by blocking the throttle passage 115 connecting the port 213 with the chamber 110. The blockage of the throttle passage 115 is effected by means of a rod 48 which can be articulated to the linkage 19 for operation by the steering gear in a manner identical with that illustrated with respect to the stem 105. A corresponding rod is provided in the throttle aperture for the other pressure chamber of the control valve. In this case, the needle-valve screws (one shown at 117) are disposed rearwardly of the rods 48 and the aperture (e.g. 115') connecting this passage with the pressure chamber. A centering spring (one shown at 103) is nevertheless provided to center the piston 102. The rods 48 are so postioned that they prevent movement of the piston 102 into its blocking positon during steering of the vehicle and curvilinear operation but permit blocking when freewheeling and immobilization occur, as described above.

The invention as described and illustrated is believed to admit of many modifications within the ability of persons skilled in the art, all such modifications being considered as falling within the invention, except as otherwise limited by the spirit and scope of the appended claims.

I claim:

1. In an automotive vehicle having a pair of wheels on opposite sides and a pair of fluid motors for individually driving said wheels, the combination therewith of a source of hydraulic fluid for said motor, independent first and second supply means respectively including a first and a second conduit for delivering fluid under pressure from said source to each of said motors, conduit means forming a shunt path across said first and second conduits between points located intermediate said source and said motors, and valve means in said shunt path responsive to a pressure differential between said first and second conduits for progressively throttling said shunt path, said valve means being provided with biasing means tending to maintain same in a normal nonblocking position whereby minor pressure differences between said first and second conduits are equalized through said shunt path.

2. The combination defined in claim 1 wherein said valve means comprises a housing having a valve chamber, a first port open toward said chamber and communicating with said first conduit and a second port open toward said chamber and communicating with said second conduit, said valve means further comprising a valve member normally held centered in said chamber between said ports, said housing further including two passages respectively communicating with said ports and terminating at opposite ends of said chamber for subjecting said valve member to a differential fluid pressure tending to move said valve member into an off-normal position blocking communication between said ports.

3. The combination defined in claim 2 wherein said vehicle is provided with steering means for driving along a curve whereby said wheels rotate at different speeds with creation of a pressure differential tending to displace said valve member from its centered position, further comprising a linkage coupled with said steering means and control means at said housing responsive to major displacements of said linkage for preventing substantial shifts of said valve member from said centered position.

4. The combination defined in claim 3 wherein said biasing means comprises a pair of counteracting springs bearing endwise upon said valve member, said control means including a movable abutment for each of said springs.

5. The combination defined in claim 4 wherein said valve member is a piston with a pair of heads at opposite ends in respective engagement with said springs, said abutment forming a positive stop for the respective head and being movable by said linkage to a location in which it arrests said piston in a nonblocking position.

6. The combination defined in claim 3 wherein said control means comprises mechanism for blocking said passages in respective extreme positions of said linkage.

7. The combination defined in claim 2, further comprising a bypass connection between said ports and a control valve for selective opening and closing of said bypass connection.

8. The combination defined in claim 7 wherein said control valve is disposed at a junction between said conduit means and said bypass connection and is additionally operable for selectively blocking said shunt path.

9. The combination defined in claim 2 wherein said housing is provided with manually operable throttle means for said passages.

10. The combination defined in claim 1 wherein one of said wheels is disposed forwardly and the other of said wheels is disposed rearwardly of the vehicle.

References Cited

UNITED STATES PATENTS

| 3,175,570 | 3/1965 | Voreaux et al. | 180—6.3 XR |
| 3,247,919 | 4/1966 | Moon | 180—6.48 |

BENJAMIN HERSH, *Primary Examiner.*

L. D. MORRIS, JR., *Assistant Examiner.*